United States Patent

Feuerherm et al.

[11] Patent Number: 5,840,223
[45] Date of Patent: Nov. 24, 1998

[54] METHOD OF BLOW MOLDING HOLLOW ARTICLES FROM THERMOPLASTIC SYNTHETIC RESIN

[75] Inventors: Harald Feuerherm; Horst Deckwerth; Rolf Kappen-Feuerherm, all of Trolsdorf, Germany

[73] Assignee: Harald Feuerherm, Troisdorf, Germany

[21] Appl. No.: 758,490

[22] Filed: Nov. 29, 1996

[30] Foreign Application Priority Data

Nov. 30, 1995 [DE] Germany .................. 195 44 634.8

[51] Int. Cl.$^6$ ........................................... B29C 49/78
[52] U.S. Cl. .................... 264/40.1; 264/541; 425/140; 425/141; 425/532
[58] Field of Search ................. 264/40.1, 40.4, 264/40.5, 40.7, 540, 541; 425/140, 532, 141

[56] References Cited

U.S. PATENT DOCUMENTS 3,795,719  3/1974  Morecroft et al. ............... 264/40.5
4,338,071  7/1982  Daubenbuchel et al. ........... 425/532
4,424,178  1/1984  Daubenbuchel et al. ........... 425/532
4,444,702  4/1984  Thomas et al. .................. 264/412
5,102,588  4/1992  Feuerherm ..................... 264/40.4
5,256,346  10/1993  Feuerherm .................... 264/40.4
5,665,399  9/1997  Enderby ....................... 264/40.4

FOREIGN PATENT DOCUMENTS 0 345 474 A3  5/1989  European Pat. Off. .
2152837  4/1973  Germany ........................ 264/541

Primary Examiner—Catherine Timm
Attorney, Agent, or Firm—Hebert Dubno

[57] ABSTRACT

A process for blow-molding hollow bodies from thermoplastic synthetic resin wherein, in addition to control to accurately position an extruder thermoplastic melt preform in the blow mold and to maintain a constant weight of the extruded preform, on the program curve which itself is a superimposition of the profile curve of the preform and a base gap determined in accordance with the nozzle gap width through which the preform is extruded, there is superimposed a correction strip which can be varied depending upon material distribution changes as a result, for example, of sag of the preform.

12 Claims, 7 Drawing Sheets

METHOD OF BLOW MOLDING HOLLOW ARTICLES FROM THERMOPLASTIC SYNTHETIC RESIN

FIELD OF THE INVENTION

Our present invention relates to a method of blow molding hollow articles from a synthetic resin and particularly a melt of a thermoplastic synthetic resin. The invention, more specifically, relates to a method of blow molding such hollow articles in which there is control of a variable nozzle gap from which the extruded melt emerges.

BACKGROUND OF THE INVENTION

In the blow molding of hollow articles from thermoplastic synthetic resin, it is known to produce tubular preforms from the synthetic-resin melt, to introduce the preform as a blank into a blow mold (and close the blow mold onto the preform) and to expand the preform by blowing air into the preform against the blow mold and the walls thereof to form the hollow article.

Adherent waste portions, which result from closing the blow mold onto the tubular preform above and below the portion of the preform to be shaped into the hollow article, can then be removed. In this system, the synthetic resin melt can emerge from a nozzle gap of an extrusion pressing head whose extrusion or nozzle gap can be controlled in accordance with a preform blank shaping wall thickness program in which the volume of synthetic resin melt required for a preform is subdivided into a predetermined number (n) of volume segments and each of these volume segments is assigned a nozzle gap setting value such that the nozzle gap setting values form a program curve when plotted against the number (n) of volume segments.

This program curve, which is a superimposition of at least a basic gap and a profile curve, enables control or regulation of the preform extrusion or ejection amounts for each of the segments utilizing, for the control, the base gap as the control parameter. The base gap can extend uniformly in conventional systems over the n volume segments of the preform. For the production of hollow bodies of thermoplastic synthetic resin, for example, canisters, two types of machines have generally been used in practice. The first operates in a continuous system, i.e. the preform is continuously extruded. The other type of machine operates in an incremental mode known as a storage head operation. By means of a piston, a synthetic resin melt in a storage chamber is expelled from the outlet of the head in a hollow extruded preform. The expulsion is effected cyclically.

The wall thickness program controlling the nozzle gap provides regions having small gap widths and at least one region associated with a substantially greater nozzle gap width. In the production of closed containers, e.g. canisters, generally at least two regions of greatly increased nozzle gap width may be required. The program curves in these regions have function maxima. The preform segment or segments corresponding to the function maxima are generally those which are subjected in the blow mold to the greatest stretching. The more extreme the program curve in certain regions, the more significant is the quantity of material which is provided and thus corresponds to the portions of the preform to be subjected to the greatest degree of stretch. Obviously it is also essential for the proper shape of the finished article and uniformity thereof that these regions of greatest stretch and thus the most extreme portion of the program curve be positioned at the correct locations in the blow mold.

Indeed, deviations of more than ±1% in the height of these regions in the blow mold can result in significant detriment to the quality of the product, especially when it is in the form of large hollow bodies. Such shifting in height can result in reduced compression of compacted regions which may have to sustain high degrees of stress, nonuniform stretching of regions which ought to have had sufficient material to allow maximum stretching to occur and thus weakened zones in the product, etc. The strength and other properties of the hollow bodies which are fabricated may be sharply reduced. Furthermore, it should also be noted that it is important that the resulting hollow body have a weight which corresponds exactly to a predetermined set point weight.

Since the extrusion parameters and especially the rate at which the melt emerges from the head depend largely upon the rheological characteristics of the synthetic resin melt, the material temperature and fluctuations therein, control of the nozzle gap and, in apparatus with a continuously operating extruder, also worm speed, have required a variety of control procedures and approaches which have not always been successful.

In EP-A-0 345 474, a process is described in which monitoring of the hollow body is effected by two different weight measurements and depending upon the weight measurements the speed of the worm and/or the storage operation of the nozzle gap of the head are controlled. Preferably, the lower waste portion after removal from the blow-molded body extracted from the mold and the net weight of the hollow body after removal of the waste portions can be measured and these measured values used for the control process.

Based upon two weight measurements it is possible on the one hand to establish the position of a predetermined portion of the preform relative to the blow mold with great precision and, on the other hand, to simultaneously maintain a predetermined weight of the blow-molded hollow body.

The preform, emerging from the nozzle gap is freely formable and, by and large, is not subjected until blowing to external forces except for those which are a result of the weight of the material. Because of the visco-elastic characteristics of the melt, the distribution of the material in the preform can fluctuate and, since these visco-elastic properties themselves can fluctuate because of variations in the melt temperature, the material composition, the extrusion time, shear stresses operating on the melt and the like, a lack of precision in the material distribution can result. In addition, partly because of the interplay of swelling, shrinkage and elongation effects, there are deviations in the wall thickness of the finished product at various locations along the latter from the desired wall thicknesses.

The swelling effect is the effect which applies to the preform as it emerges from the nozzle orifice and which results from a molecular disorientation in the product within the flow channels. The shrinkage effect is the shrinkage which occurs when the preform cools after leaving the extrusion head and which is a result of a tendency of the disoriented molecules to pull together. Elongation effects are those which tend to draw the thermoplastic out as a result of the intrinsic weight of the preform.

Indeed, as the weight of the preform increases during extrusion of the preform generally downwardly, these effects result in a reduction in the diameter and wall thickness of the preform directly below the outlet of the extrusion head. The elongation tends to increase progressively from the beginning extrusion of the preform, i.e. from the lower edge of the preform and the first of the n volume segments into which the preform can be subdivided, growing greater as the number n increases.

The discharge velocity of the material at the head thus appears to increase over the course of preform extrusion. The described visco-elastic effects have a complex interdependency. With longer extrusion times and higher temperatures of the extruded mass, the elongation is greater. As the elongation tends to increase, the swelling at the outlet of the extrusion head tends to decrease. On the other hand, the swelling tends to increase upon a reduction of the nozzle gap and with an increasing speed of the extruder worm.

With longer extrusion times, the shrinkage in the lower part of the preform at the greatest distance from the nozzle gap tends to increase. A composite of these visco-elastic effects of swelling, elongation and shrinkage can be described as "sag" herein.

The form of the program curve used hitherto to control such an operation was determined by the visco-elastic properties of the synthetic resin melt for a particular temperature, mass throughput, material, nozzle gap width, extruder screw speed and optionally other operating parameters and took into consideration the sag in determining the operating point only to the extent that the sag was dependent upon these operating parameters. Deviations of the operating parameters from the values which were the basis for determining the program curve resulted in an adverse effect upon the material distribution so that, for example, there were changes in the spacings between the maxima of the material in the preform and thus variations in the product quality since there tended to be a reduction in thickness of the product at greatest stretch regions and thickenings in lesser stretch regions. The variations in material distribution could only be incompletely compensated by the prior art control process.

Consequently, even when the extruded or ejected preform had the desired weight and was positioned accurately in the blow mold, the described variations in the visco-elastic effect could give rise to the irregularities in the finished product as described, especially as to the distance between two preform segments which may include the material maxima and were the most critical for expansion or stretching of the preform. Indeed, even very small changes in this distance can lead to significant quality differences in the product.

OBJECTS OF THE INVENTION

It is, therefore, the principal object of the present invention to provide a process which extends the principles previously described to enable an additional control which makes it possible to hold to the length and weight set point of the preform but nevertheless is capable of correcting for otherwise detrimental changes of material distribution which result from visco-elastic properties of the synthetic resin melt.

Another object of this invention is to provide an improved method of blow-molding hollow articles which allows the precision with respect to distribution of the material over the length of the preform to be enhanced and thus can avoid defects in the product.

SUMMARY OF THE INVENTION

These objects and others which will become apparent hereinafter are attained, in accordance with the invention in that, in addition to a control effected in accordance with EP-A-0 345 474, at least one measured value of the material distribution in the preform or in the hollow body is compared with a reference value and, for the purpose of eliminating a deviation from the reference value, the program curve controlling the nozzle gap width is corrected, i.e. a correction value is superimposed on the program curve which specifically influences the sag. The correction for the program curve can have positive and negative values.

The superimposition of the correction can be effected in various ways. In a first embodiment, where the program curve is formed by the superposition of the base gap and a profile curve, a correction strip is further superimposed whose function value represents a nonlinear function and the correction value is determined so as to compensate for deviations of the material distribution and is a product of a profile factor and the values of the correction strip associated with the particular volume section. The profile factor is a function of the control deviation of the material distribution. The correction strip preferably is in the form of a ramp which begins at the lower edge of the preform or the associated volume segment n=1 and can increase overproportionally over the number n of volume segments. The ramp shape of the corrections is a consequence of the fact that portions of the preform extruded subsequently are subject to a greater preform weight and thus greater gravitational forces which tend toward greater elongation. As a consequence of the complex interaction between elongation and weight, the dependency of the preform portion emerging from the gap is nonlinear. Preferably we operate with an exponentially increasing ramp.

In a further feature of the invention, the correction strip forms a ramp with a profile that is substantially mirror symmetrical to that of the profile curve. This embodiment is based upon the recognition that greater wall thicknesses of the preform are subjected to less elongation than regions with lesser wall thicknesses. The correction strip thus follows the profile curve but has, where the profile curve has a function maximum, a corresponding function minimum. Regions of the profile curve which have a lesser wall thickness thus correspond to portions of the correction curve with greater value. If the profile of the correction strip is then multiplied by a profile factor, as described, there are smaller correction values for regions of the program curve corresponding to its function maxima and greater correction in regions of the program curve which correspond to a smaller wall thickness of the preform. The correction strip can have the configuration of the inverse or reciprocal program curve or profile curve with a ramp increase. When the elongation and optionally the swelling and shrinkage are described by empirical or semi-empirical functions as a function of material and machine data, these functions can be used to develop a correction strip which is fully effective in accordance with the invention.

In still a third embodiment of the invention, the function values of the program curve or the profile curve are themselves multiplied by a profile factor which is determined as a function of the control deviation.

Finally, a correction program can be run synchronously with the wall thickness program in the development of the preform and which provides the correction values for the program curve of the wall thickness program. The correction values can be developed from a theoretical model on the basis of the shrinkage, swelling and elongation in dependence of material data and process parameters, in combination with empirical tests. The determination of the correction values is preferably effected so that at least the preform segments which contain the function maxima of the program curve maintain the narrowest tolerances with respect to the positions and spacings of the function maxima and thus so that the thickness of the preform segments at these locations are accurately maintained.

When positive and/or negative corrections are applied to the program curve, these may have an effect upon the amount of extruded material per unit time. The change in the melt mass per preform can be canceled out in the same or the next operating cycle according to the invention so that the preforms always have the same weight. In a preferred embodiment of the invention, the correction is so carried out by modifying the program curve that the program curve always has the same area below it, i.e. so that the amount of material contained in each preform remains constant. Immediate modification of the wall thickness program can avoid undesired defects in the finished product immediately upon the preform extrusion or ejection.

According to the invention, moreover, the change in base gap and/or another portion of the program curve can be limited to one segment of the preform or to a limited number of segments of the preform. Preferably the point in time of the change is determined by the running of the wall thickness program itself.

The measurement of the material distribution in the preform can also be effected in various ways. For example, the measured value can be obtained in terms of a measurement of the material distribution in successive cross sections of the preform or by averaging the material distribution over sections of the preform. Weight measurements can be effected on one or more of the portions or cross sections of the hollow body which is produced and deviations of such weight measurements from predetermined set points can be utilized as the correction value. In a preferred method of the invention, the hollow body is weighed together with at least one of the waste portions formed thereon during the blow-molding operation.

Alternatively or in addition, the measurement of the material distribution in the preform can be effected by applying at least one marking to the preform emerging from the nozzle gap, the position of this marking being compared with a set point position for the marking once the preform has been fully extruded or ejected or by comparing the marking to a resulting mark on the blow-molded hollow body or by comparing the resulting marking on the blow-molded hollow body with a predetermined set point position. A plurality of such markings can be applied to the preform and the spacing between the markings measured on the fully extruded preform or on the hollow body. Finally in this connection, it is possible to carry out wall thickness measurements on the blow-molded hollow body and/or on the preform and to determine the correction values based upon these measurements.

More effective use of the process of the invention can make use of a succession of signal generators along the path of the extrusion or ejection of the preform to determine the material distribution. A single signal generator can be provided as well with the preform traversing this signal generator during the production thereof. If desired, a camera can be used which can respond to the speed of extrusion of the preform. By comparison of the results from the signal generators or the camera, the extrusion time can be measured and compared with set point extrusion times to establish correction values for the effect of sag. Preferably the deviations of the extrusion times from determined set points are established and the set point deviations are compared with one another to generate correction values for the program curve when the deviations differ from one another. All of the foregoing measurement processes can be used in optional combinations.

The process of the invention provides for additional control during the preform extrusion or ejection and, in conjunction with maintaining a predetermined weight of the blow-molded product and/or a predetermined position of the preform in the blow mold, provides for greater precision and hence improved quality of the blow-molded product. The position regulation compensates for fluctuations in the rate of extrusion of the melt and visco-elastic effects which can result by changes in the charge, the material mixture, the addition of coloring agents and the like. The position control is preferably so carried out that at least one function maximum of the curve is located at a volume segment of the preform which is positioned within very narrow tolerances in the mold with great precision. The preform segment containing that function maximum represents a critical cross section of the preform that is subjected in the mold to a very high degree of stretch.

The control in accordance with the invention of material distribution, when the preform is in the desired position relative to the blow mold but the material distribution in the preform is unsatisfactory, is a vital part of the invention. It will be self-understood that the different control processes for position correction of the preform in the blow mold and, optionally, for correction of the weight of the molded hollow body, together with the elimination of material distribution deviations from a standard which can result from sag of the preform can all take place at the same time when a sufficient number of measured values are taken and, based upon the measured values, the settings are quantitatively or at least with respect to their trends, appropriately adjusted.

According to a preferred embodiment of the invention, for each blow-molded hollow body, three weight measurements are made, especially the weight of the lower waste portion, the net weight of the hollow body from which the waste portions are removed, and the weight of the upper waste portion. Instead of the weight of the upper waste portion, we can use as well the gross weight of the hollow body (i.e. the sum of the weight of the lower portion, the net weight of the hollow body and the weight of the upper weight portion).

Using two weight measurements, the adjustment points for both a position correction and weight correction can be established. The control process can be that of EP-A-0 345 374. The third weight measurement is used for establishing the correction value influencing the material distribution. The three described weight measurements admit of quantitative correction or correction at least in terms of the trend so that defects with respect to the position of the preform, with respect to the molded body weight and with respect to the material distribution in the preform can be eliminated in a single cycle.

The method of the invention can thus comprise the steps of:

(a) extruding a tubular preform from a thermoplastic synthetic resin melt by forcing the thermoplastic synthetic resin melt through a nozzle gap having a variable gap width;

(b) providing, as a predetermined wall-thickness program for controlling the gap width as a function of a length of the preform, a program curve which, plotted over n successive volume segments over the length of the preform, comprises a profile curve representing a preform thickness characteristic superimposed upon a base gap;

(c) varying the gap width in accordance with the predetermined wall-thickness program thereby extruding successive volumes of extruded thermoplastic synthetic resin melt for the n successive segments over the length of the preform;

(d) measuring at least one parameter of distribution of the extruded thermoplastic synthetic resin melt in the preform or distribution of thermoplastic synthetic resin in a blow-molded product fabricated from the preform to obtain a measured value and comparing the measured value with a control;

(e) applying to gap width set points determined by the program curve of the wall thickness program corrective values influencing sag of the preform so as to eliminate deviations of the measured value from the control, thereby rapidly compensating for visco-elastic changes in the preform during formation thereof;

(f) blowing the tubular preform in a blow mold to expand the tubular preform and produce a blow-molded article therefrom having waste portions; and (g) removing the blow-molded article having waste portions from the blow mold and detaching the waste portions from the blow-molded article.

It is also an aspect of the invention to provide a method of blow-molding hollow articles and especially canisters which comprises the steps of:

(a) extruding a tubular preform from a thermoplastic synthetic resin melt by forcing the thermoplastic synthetic resin melt through a nozzle gap having a variable gap width while adjusting the gap width for successive volume segments of the preform so that, for each segment a particular volume of the melt is extruded in the preform in accordance with a predetermined program curve for a wall thickness program of the preform supporting different degrees of stretching and compression of the preform in the subsequent formation of the blow-molded article;

(b) blow molding the tubular preform, thereby effecting different decrease of compression and stretch along the preform and shaping a hollow article with waste portions attached thereto;

(c) weighing the hollow article and at least one of the waste portions to monitor visco-elastic properties of the material of the melt and deviations in a distribution of the material in the hollow article from a desired distribution, thereby deriving correction values and modifying the curve in accordance with the correction values;

(d) repeating step (a) with control of the gap width to produce a subsequent preform with a corrected distribution of material of the melt corresponding to the corrected program curve of step (c); and (e) repeating steps (c) and (d) to produce a series of blow-molded articles with respective preforms all of substantially identical melt volumes of the respective preforms.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
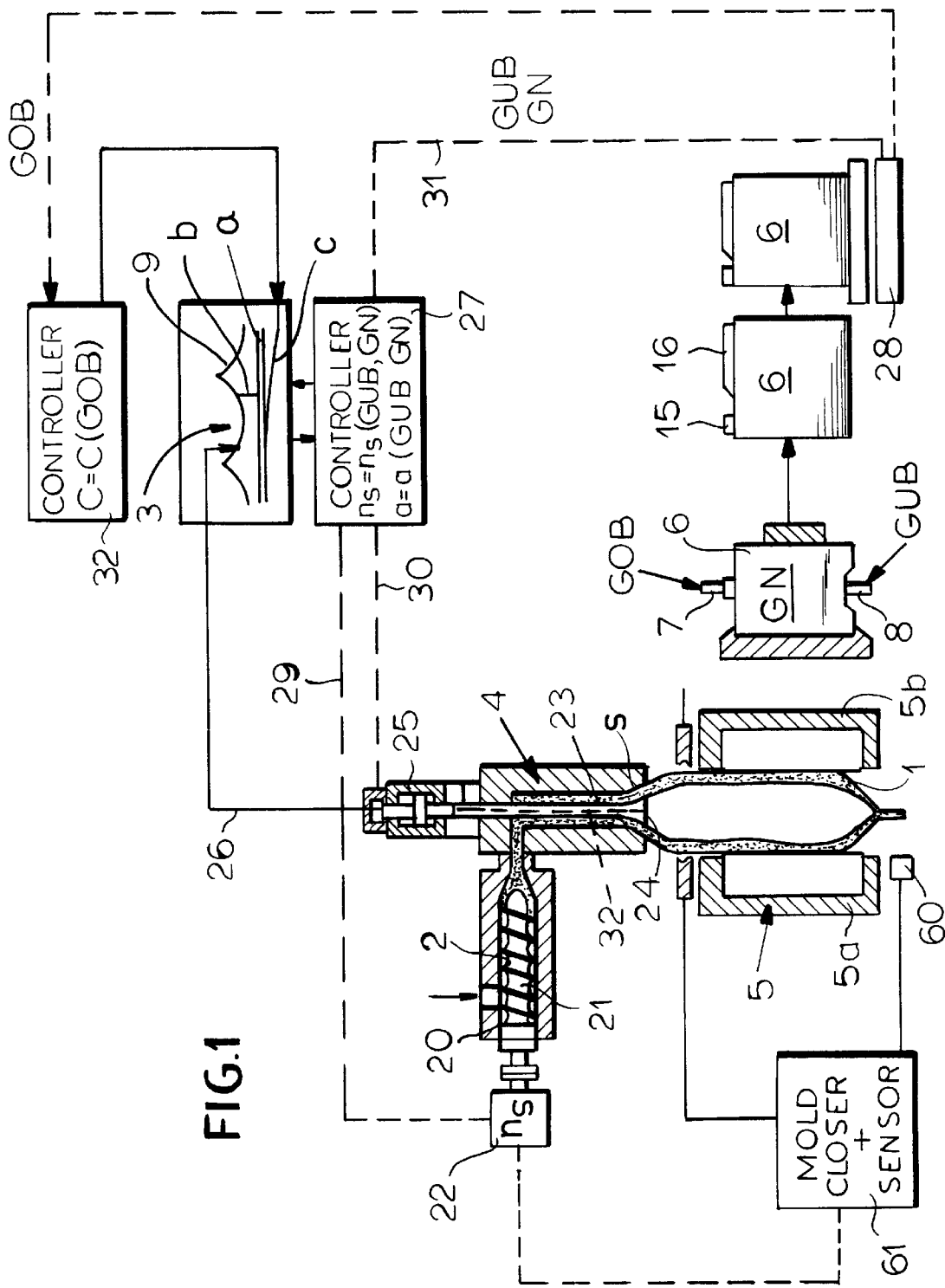
FIG. 1 is a diagrammatic sectional view, with portions in block diagram form, of an apparatus for blow molding hollow bodies from thermoplastic synthetic resin in accordance with the invention.
Figure 6:
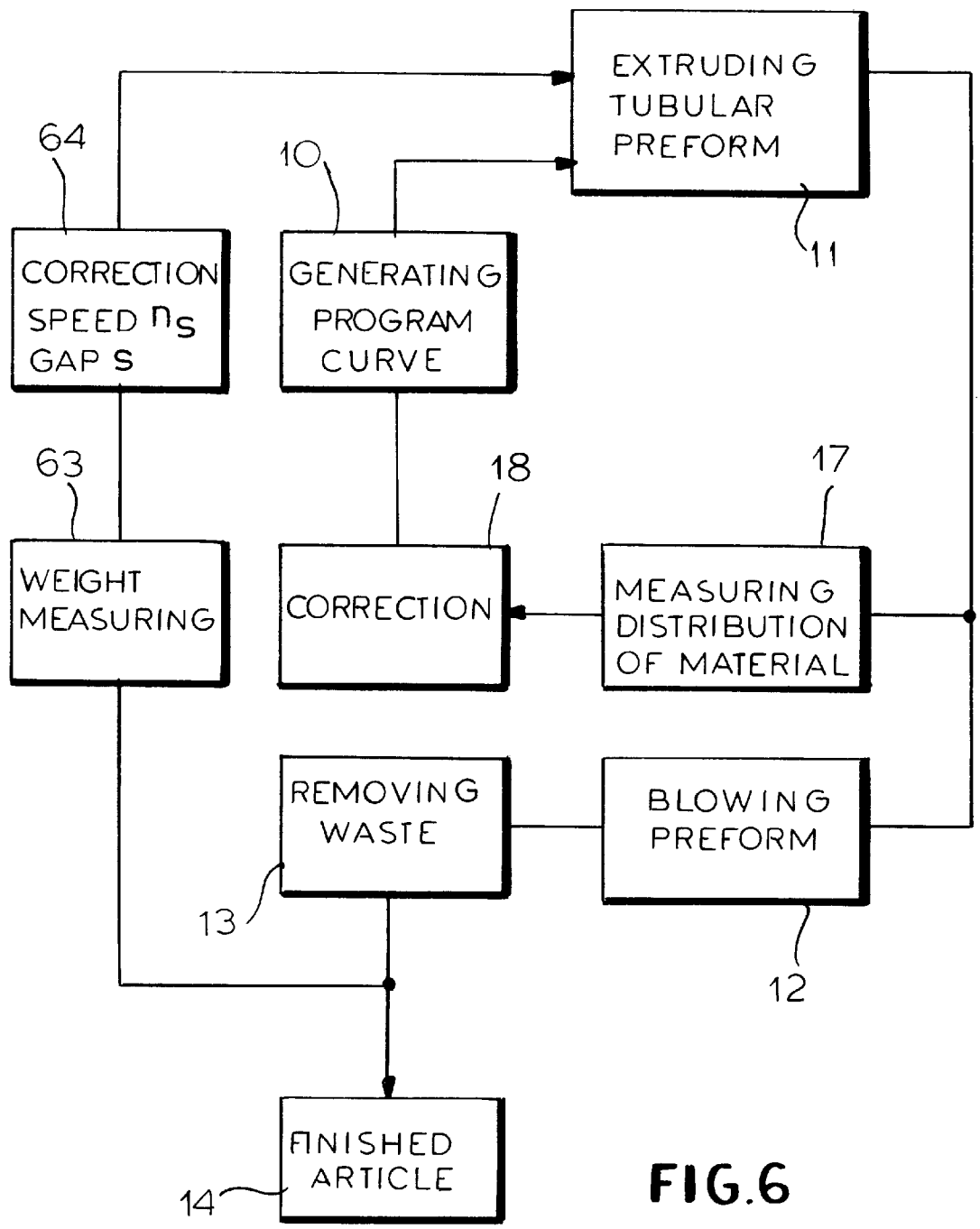
FIG. 6 is a diagram illustrating method steps of the invention.

Referring first to FIG. 6, it will be apparent that the basic steps of the invention involve generating a program curve at 10, extruding the tubular preform at 11, blowing the preform at 12 to produce the blow-molded article with the waste portions attached thereto, removing the waste portions at 13 and obtaining the finished article at 14, the article being, for example, a blow-molded canister with a spout or the like as shown at 6 in FIG. 1, the spout portion being seen at 15 and handle portion at 16.

The preform extrusion is so controlled that the preform will assume a predetermined position in the blow mold on closure thereof and so that the hollow body blown from the preform will have a predetermined net weight. Upon deviation of the actual value from a respective setpoint, the nozzle gap and optionally also the extruder-worm speed are changed. This part of the control is carried out as in the process described in EP-A-0 345,474 using the weight measurement 63 and the correction 64 shown in FIG. 6.

In addition to this type of control, in the method of the invention (FIG. 6), the parameter of distribution of the material in the extruded product is measured at 17, e.g. by a wall thickness measurement or an additional weigh measurement to obtain correction values at 18 for the different segments along the length of the tubular preform and the correction values are applied to the program curve as will be described in greater detail below for modifying the extrusion gap in the production of future preforms.

Returning to FIG. 1, it can be seen that the apparatus basically comprises an extrusion press head 4 from which a tubular preform 1 is extruded utilizing a worm extruder 2 to supply the head with the thermoplastic synthetic resin.

The extruder 2 can receive the thermoplastic synthetic resin at an inlet 20 and can have a worm 21 driven by a motor 22 at a speed $n_s$, the speed determining the rate at which the plastified synthetic resin is fed to a passage 23 in the head 4. The latter includes a central member 24 defining a nozzle gap S which can be varied by an effector 25 in response to a control signal 26 shown to follow a program curve 9 of a wall thickness program 3 of a control unit 27. The controller 27 receives inputs from the program 3 and can control the effector 25 and the extruder as represented by the control lines 29, 30.

In the position of the preform 1 shown in FIG. 1, it is hanging from the nozzle gap S in between the halves 5a and 5b of an open blow mold 5 which, when closed, defines the external configuration of the finished canister 6. The central member 23 also has a passage 32 to which blowing air is fed so that the preform, when the mold is closed, can be blown to the shape of the mold cavity.

As is also apparent from FIG. 1, when the blow-molded article is removed from the mold, it may have waste accumulations or portions 7 and 8 which are attached to the blow-molded article and are removed therefrom in a subsequent step. Function testing, especially by weighing and sealing tests, can then follow.

The preform extrusion is so controlled by the conventional processes described that the preform reaches a predetermined position between the mold halves determined by the sensor 60 before the blow mold 5 completely closes (via mold closer 61) and such that the blow-molded article 6 which will ultimately result will have a predetermined net weight after all waste accumulations have been broken off or cut away.

In an example, two weight values, for example, the net weight GN of the blow molded article and the weight GUB of the lower waste portion can be measured. Should the weight measure deviate from the set point values, the worm speed of the extruder 2 and/or the width of the gap S can be adjusted by the actual value/set point comparison (e.g. using controller 27) to maintain product uniformity within certain limits. This type of control is described in EP-A-0 345 474 and can be used in accordance with the invention, although augmented by the wall thickness control utilizing the program curve as described in greater detail.

Figure 2:
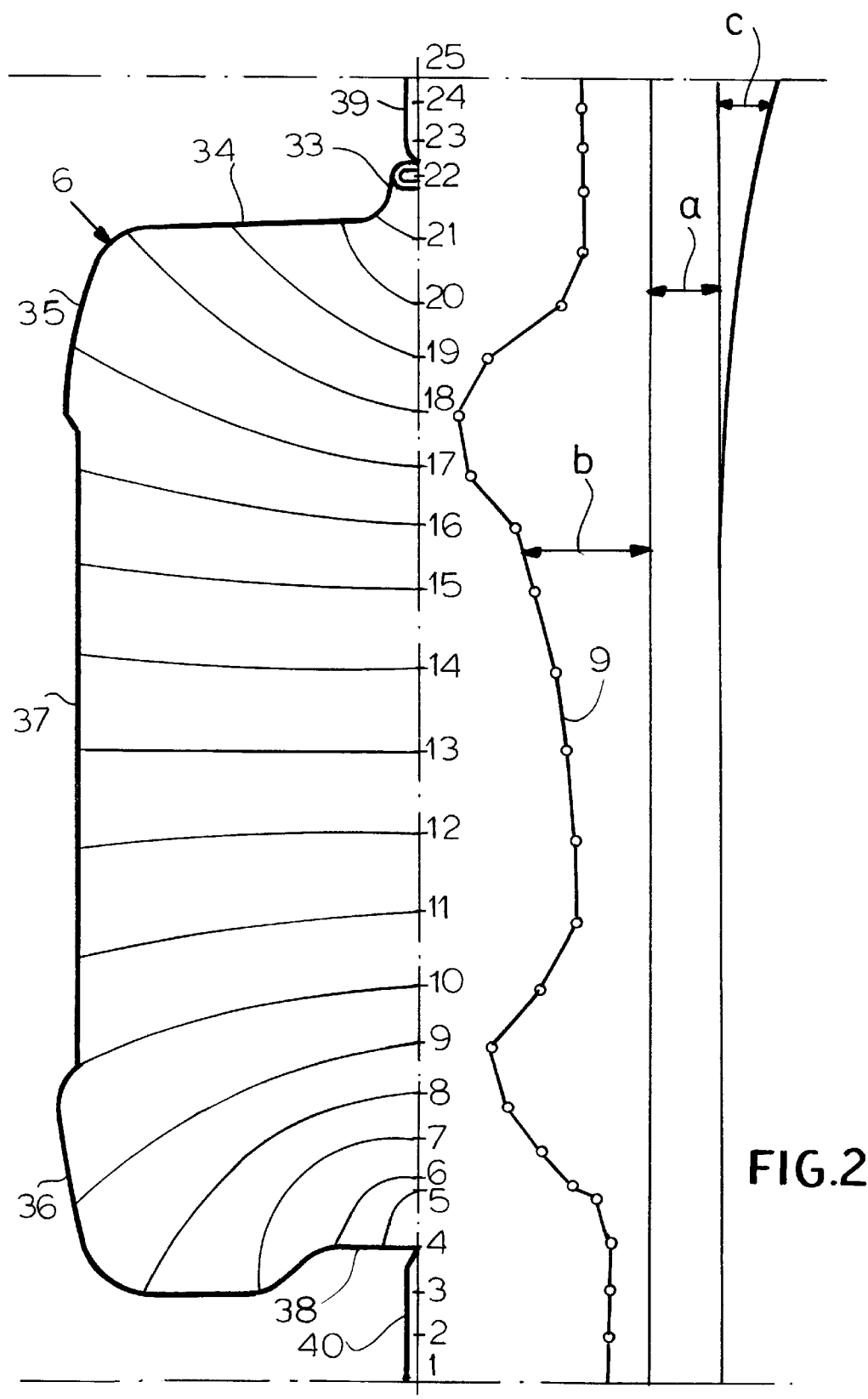
FIG. 2 is a graphic illustration of half of a blow molded article in the form of a canister with the associated program curve.

As shown in FIG. 2, the canister 6 to be made from a preform can have a neck 33 at its spout which may be desired to have a greater thickness, a shoulder region 34 which is to be stretched to an intermediate extent, corner regions 35 and 36 which are to be stretched to greater degrees and a body portion 37 which may be stretched to still another degree. The bottom 38 may be stretched still differently by the blow-molding operation. In addition, the regions 39 and 40 at opposite ends of the blow-molded article may form wastes where the blow mold clamps against the preform. FIG. 2 thus represents the length of the preform 6 from its lower portion to its upper portion subdivided into n sections where, in the illustrated case, substantially 25 such length sections are provided.

FIG. 2, therefore, represents the adjustment of the gap width S in accordance with the wall thickness program as a function of the preform length. The wall thickness program 3 subdivides the volume of the synthetic resin melt required for a preform 1 into a predetermined number n of volume sections and associates each volume section with a respective nozzle gap width s. The adjusted variations of the nozzle gap width a taken over the number n of volume section is given in the form of the program curve 9 which has been plotted in FIG. 2 and is programmed in an analog manner or digitally. The program curve 9 in turn is formed by a uniform base gap a and a profile curve b which is superimposed upon the base gap a. The program curve 9 has limited regions in which there are significant function maxima which correspond to preform regions which are to be most strongly stretched upon blow-molding in the blow mold. These can correspond especially to the corner regions of a canister which, in the illustrated embodiment, forms the blow-molded product.

In the embodiment illustrated, each hollow body 6 can have a third weight portion, preferably the weight GOB of the upper waste portion, which can be determined and can be compared with a set point weight. The weight GOB of the upper waste is a measured value for a sag of the preform. The term "sag" is used here to refer to the totality of a number of visco-elastic effects including a swelling effect, a shrinkage effect and a lengthening effect which results from visco-elastic properties of the extruded resin and the intrinsic weight of the preform. They all depend upon characteristics of the material. When the weight GOB of the upper waste deviates from the set point value thereof, this is an indication that the material distribution in the preform no longer corresponds to the required distribution.

The deviation of the material distribution in the preform from its desired distribution is corrected in accordance with the invention by applying a correction value for the nozzle gap width a defined by the program curve 9. In other words a correction is applied by a controller 32 to the program curve value which is a measure of the sag of the preform. From FIG. 2 it will be apparent that the program curve 9 therefore involves the superposition of the basic gap a, the profile curve b and a correction strip c which itself is a nonlinear function of the location along the preform. The correction value d for a control deviation of the material distribution is determined by the value of the correction strip c for the particular volume segment n by multiplication by a profile factor f the formula being:

$$d = c \cdot (f - 1).$$

Figure 7:
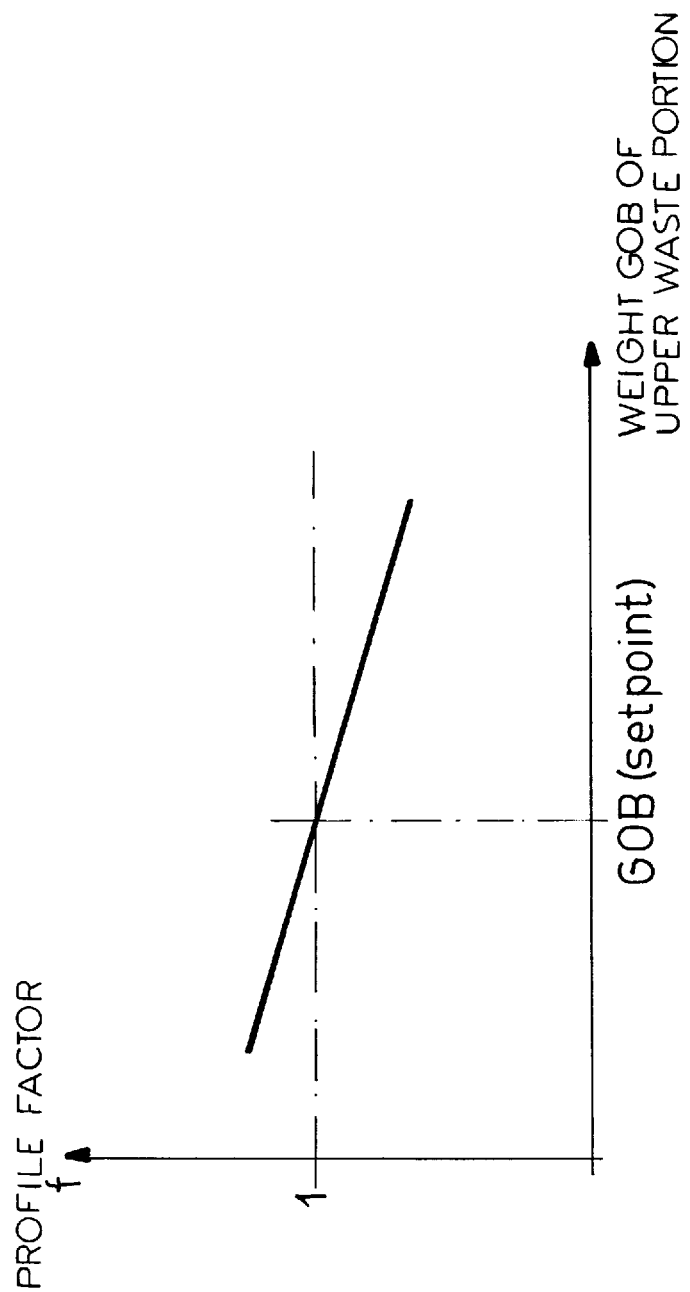
FIG. 7 is a graph illustrating the profile factor.

The profile factor f is a function of the weight difference between the set point weight of the upper waste portion and the actual measured weight GOB thereof, as schematically shown in FIG. 7. It should be apparent also that the profile factor can also be a function of another control deviation representing the material distribution. With weight measurements, especially of the weights of the upper waste portion GOB, of the hollow article 6 and of the lower waste portion GUB, control-deviations resulting from variations in the position of the preform in the blow mold upon the material distribution in the finished product can be compensated to thereby adjust the material distribution for the next preform in a single repetition of the process.

The correction strip forms a strip which begins usually at the lower edge of the preform corresponding to the volume segment n=1 and increases superproportionally over the n volume segments. In the embodiment illustrated in FIG. 2, only the more pronounced portions of the ramp c are visible, the ramp c rising exponentially. When the ramp is multiplied by a profile factor as previously described, to yield the correcting factor d, the latter is relatively small in the lower portion of the preform 1 to the point that it is hardly visible in FIG. 2, but superproportionally increases toward the upper end of the preform.

Figure 3:
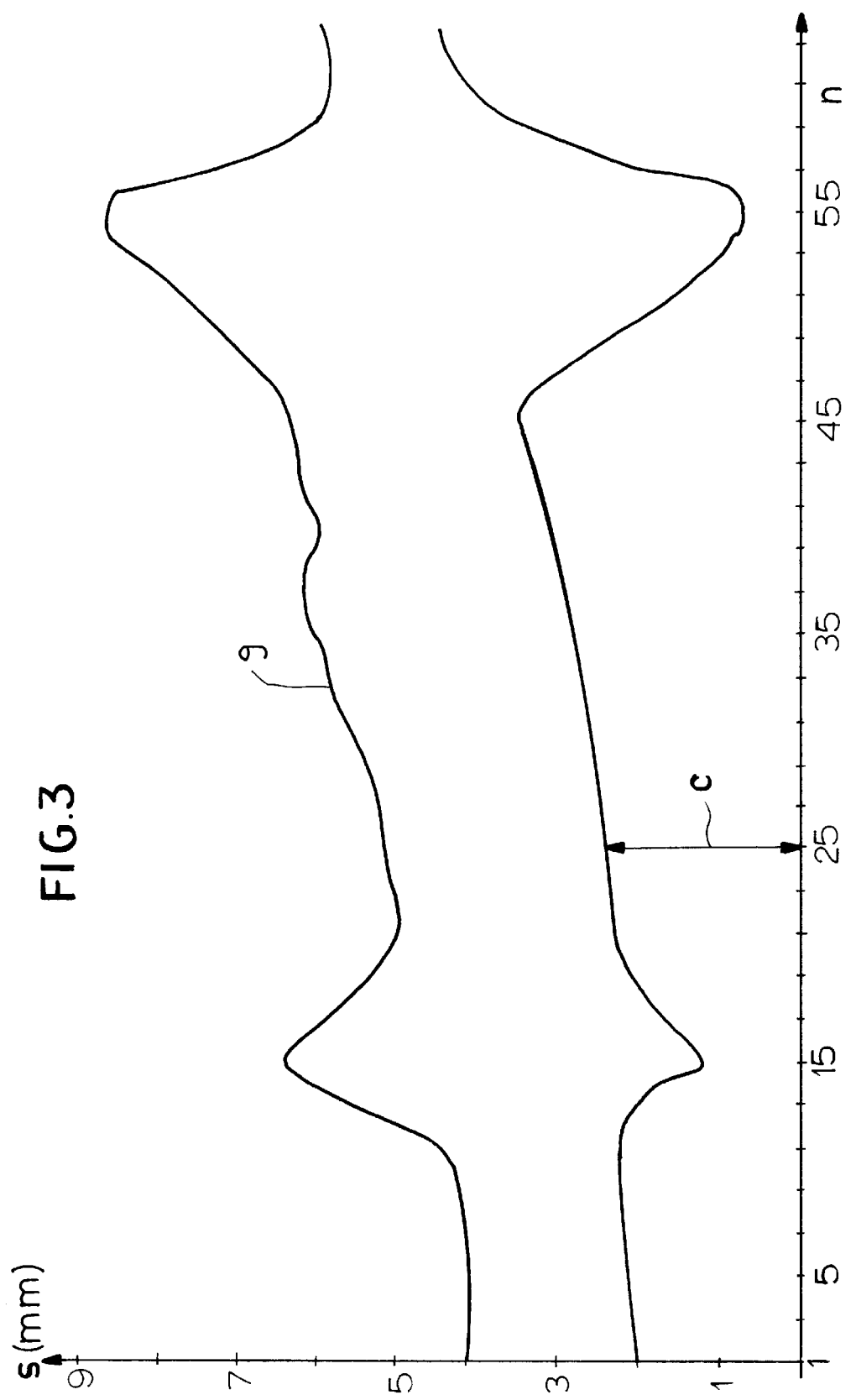
FIG. 3 is a graph of the adjustment of the nozzle gap in accordance with a further program curve.

FIG. 3 shows the adjustment of the gap s in accordance with a different program curve 9 which rises from the lower end of the preform where n=1 and increases to the upper side of the preform and which has two function maxima as has been described. The correction band c illustrated in FIG. 3 also forms a ramp which rises substantially parallel to the rise of the program curve 9 but which has a profile that is substantially mirror symmetrical to the program curve. In the regions in which the program curve 9 has a function maxima, the profile of the correction band c has minima. If a deviation of the material distribution from the reference value must be eliminated by a control operation, the correction strip is multiplied by a profile factor f.

The profile factor has a graph, as has been schematically shown in FIG. 7. If the material distribution corresponds to the reference or setpoint value the profile factor has the value 1. If the material distribution deviates from the desired or reference value the profile factor will have a positive value different from 1.

The correction value which is obtained by multiplication of the profile factor f with a minimum in the curve is smaller than that which is obtained over the remainder of the range. As a result, in the region of the function maxima of the program curve, the correction values are smaller than in the remaining regions. This is based upon the fact that thick-walled regions of the preform require less correction than thin-walled regions thereof.

If a correction value d is superimposed upon program curve 9 to provide the nozzle gap value s which is influenced by the sag of the preform, the basic gap and/or other parts of the program curve are fitted such, that the mass of the melt remains unchanged. The invention thus allows, by a determination from three weight measurements, the derivation of significant information as to amount of material, position of sag which can be used to compensate for changes in the material distribution of the preform and to reverse detrimental changes in the material distribution of the preform and to reverse detrimental changes in the distribution.

Figure 4:
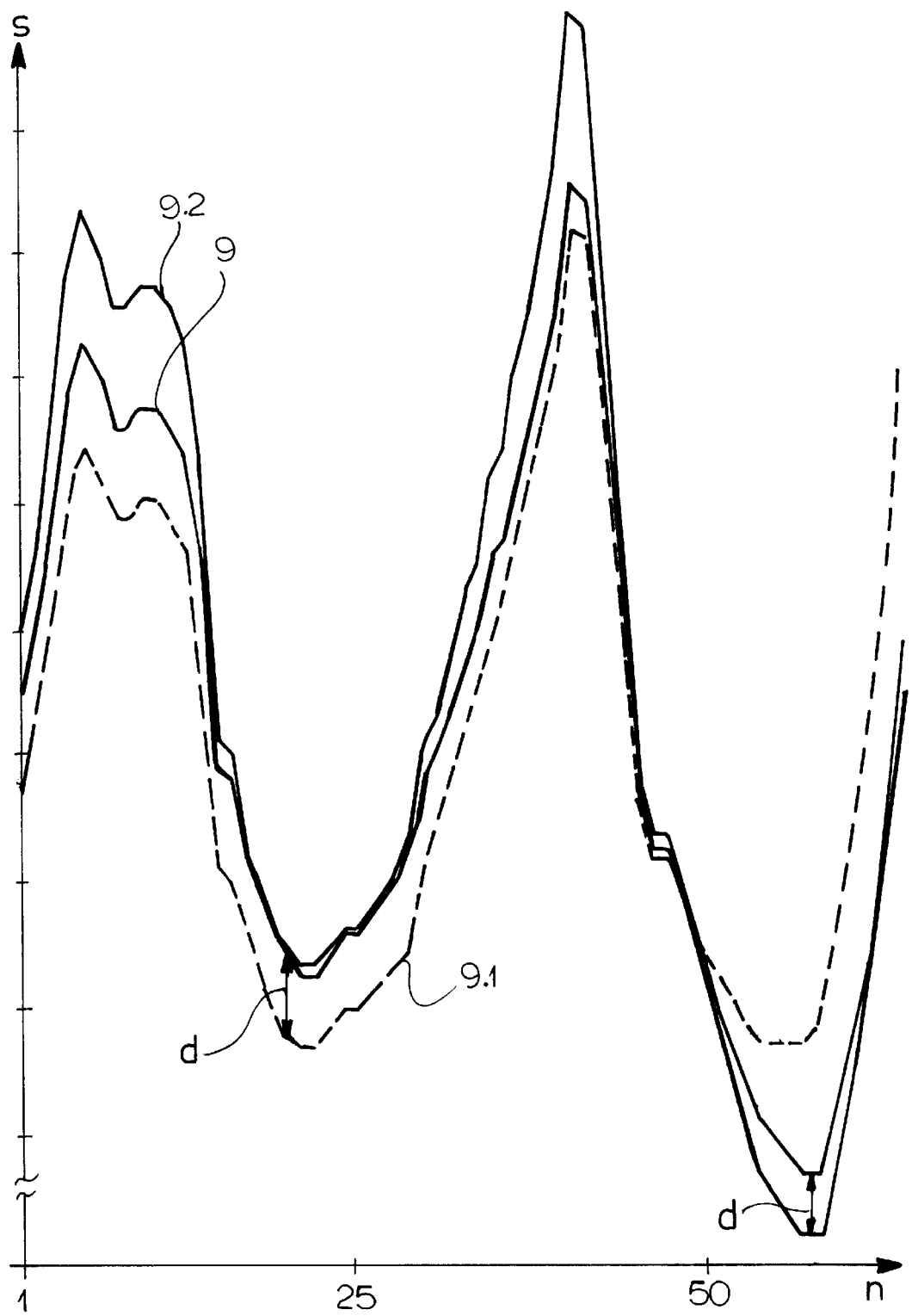
FIGS. 4 and 5 are graphs showing variations of a program curve by the superimposition of correction values thereon.

FIG. 4 shows a number of examples of changes in a program curve 9 by superimposing correction values d thereon to correct deviations in the material distribution in a subsequent preform 1. The program curve 9 in each case comprises two significant maxima which represent thick-walled portions of the preform. If the material distribution in the preform deviates from the reference value while the preform 1 has the correct weight and assumes the correct position in the blow mold 5, the correction values d are applied to the program curve 9 by the computer and influence the sag of the next preform. The curves 9.1 and 9.2 represent corresponding examples of corrected program curves. The magnitude of the correction values, of course, are dependent upon the materials used, the machine characteristics and properties desired in the blow-molded product. The corrected program curve 9.1 corresponds to a correction strip c in the form of a ramp which begins at the n=1 volume segment and extends over substantially all n volume segments. The ramp rises exponentially. The correction value d itself is a result of a product of the ramp height c and a profile factor f, being calculated by the formula $$d = c \cdot (f-1)$$

wherein f is a function of the weight difference between the weight GOB of the upper waste portion and the set point weight $GOB_{setpoint}$, as shown in FIG. 7, or is a function of another control deviation representing the material distribution.

The gap 8 through-which the material is extruded is adjusted to follow the corrected curve 9.1 so that the overall melt quantity used in the production of the preform remains unchanged from the quantity used in the preceding preform in which, for example, the gap was controlled in accordance with the program curve 9. In other words, the areas under the program curves 9 and 9.1 are equal.

The program curve 9.2 represents a case in which the function value of the program curve 9 or the function value of the profile curve b (the function of the program curve from which the base gap and any correction strip has been deducted) are multiplied by a profile factor, the profile factor being determined as a function of the measured control deviation basically shown in FIG. 7. Here as well the base gap a for another portion of the program curve 9 are so matched that the melt quantity required for the particular preform remains the same as the quantity required prior to the correction. The areas under the program curve 9 and 9.2 are thus the same.

In the embodiments described, the deviations are determined by weight measurements on the molded body sections, namely, the blow-molded product itself and the waste portions removed therefrom to detect the deviations of the material distribution from the standard. Of course other measurements can be used which are responsive to the variations in material distribution alone or in combination with the methods described. These can include wall thickness monitoring utilizing transmitted radiation, X-ray techniques and the like.

Figure 5:
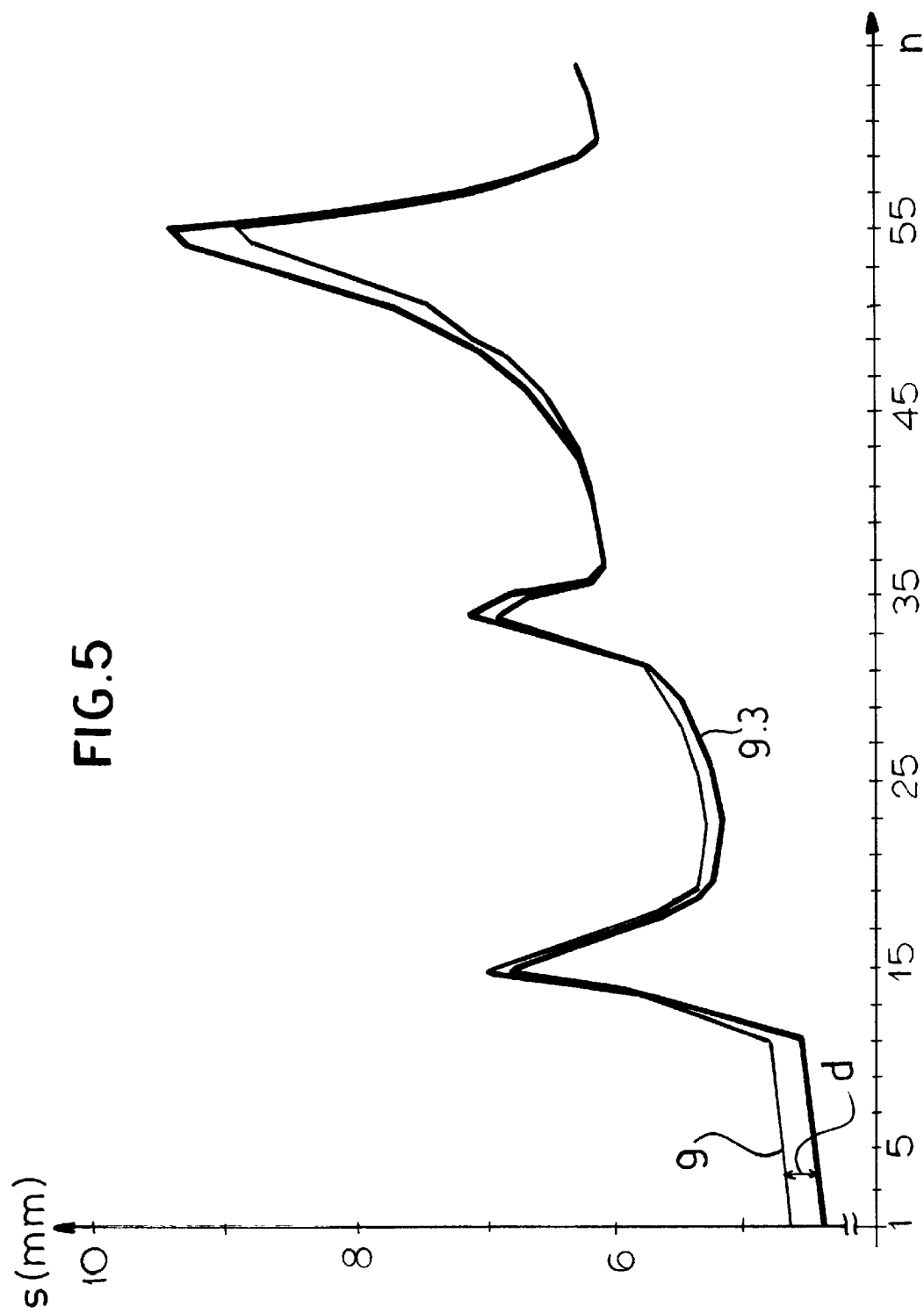

FIG. 5 shows a further embodiment in which the correction d is superimposed upon a program curve 9 which, in this embodiment, has more than two maxima. The diagram indicates that the mean gap width increases toward the end of the preform (n=63) so that with increasing preform weight, there is a greater rate of increase than in the volume segments closer to the lower edge of the preform.

After application of the correction value d, the program curve 9.3 is obtained. The program curve 9.3 is a result of a multiplication of the profile curve (i.e. the program curve from which the base gap has been deducted or excluding the base gap) with the profile factor in combination with a reduction in the base gap (a) and with the further provisions that the quantity of melt for each preform remains constant, i.e. such that the areas under the program curves 9 and 9.3 in FIG. 5 are also identical.

We claim:

1. A method of blow molding hollow articles of a thermoplastic synthetic resin, comprising the steps of:

(a) extruding a tubular preform from a thermoplastic synthetic resin melt by forcing said thermoplastic synthetic resin melt through a nozzle gap having a variable gap width;

(b) providing, as a predetermined wall-thickness program for controlling said gap width as a function of a length of said preform, a program curve which, plotted over n successive volume segments over the length of the preform, comprises a resultant obtained by superimposition of a base gap, a profile curve and a correction strip, said profile curve representing a preform thickness characteristic and said correction strip having the configuration of a ramp constituting a nonlinear function;

(c) varying said gap width in accordance with said predetermined wall-thickness program thereby extruding successive volumes of extruded thermoplastic synthetic resin melt for said n successive segments over said length of the preform;

(d) measuring at least one parameter of distribution of said extruded thermoplastic synthetic resin melt in said preform or distribution of thermoplastic synthetic resin in a blow-molded product fabricated from the preform to obtain a measured value and comparing said measured value with a control value;

(e) applying to gap width set points, determined by said program curve of said wall thickness program, corrective values influencing sag of said preform so as to eliminate deviations of said measured value from said control value, thereby compensating for visco-elastic changes in the preform during formation thereof, said correction values being obtained by multiplication of the values of the correction strip with a profile factor, said profile factor being a function of the at least one parameter of distribution;

(f) blowing said tubular preform in a blow mold to expand the tubular preform and produce a blow-molded article therefrom having waste portions; and (g) removing said blow-molded article having waste portions from said blow mold and detaching said waste portions from said blow-molded article.

2. The method defined in claim 1 wherein the correction strip continuously increases superproportionally over the total number of volume segments.

3. The method defined in claim 2 wherein the ramp rises exponentially.

4. The method defined in claim 3 wherein the ramp has a profile which is substantially mirror symmetrical to one of the profile curve and the program curve.

5. The method defined in claim 1 or 4 wherein the base gap or another part of the program curve is so matched upon application of the correction value that the melt quantity used for each preform is constant.

6. The method defined in claim 1 or 4 wherein weight measurements are effected on at least one segment of the hollow body and deviation of at least one weight measurement from a predetermined set point is used to determine the correction value.

7. The method defined in claim 1 or 4 wherein the preform extruded from the nozzle gap has at last one marking whose position is compared with a completely extruded or injected preform or is located on the hollow body and is compared with a set point position whereby the length deviation form a predetermined set point value serving for establishing the correction values.

8. The method defined in claim 1 or 4 wherein wall thickness measurements are effected on the hollow body or the preforms and after each measurement, the correction values are obtained.

9. The method defined in claim 1 or 4 wherein a plurality of signal emitters are tied together by a measuring device and wherein, by an extrusion time comparison, the measured extrusion times for influence of correction values on the sag are determined.

10. The method defined in claim 9 wherein the deviation of the extrusion time from predetermined set point values are determined, the set point deviations are compared with one another and a correction is provided for the program curve when the set point deviations differ from one another.

11. A method of blow molding a succession of hollow articles of a thermoplastic synthetic resin, comprising the steps of:

(a) extruding a tubular preform from a thermoplastic synthetic resin melt by forcing said thermoplastic synthetic resin melt through a nozzle gap having a variable gap width while adjusting said gap width for successive volume segments of the preform so that, for each segment, a particular volume of the melt is extruded in the preform in accordance with a predetermined program curve for a wall thickness program of the preform supporting different degrees of stretching and compression of the preform in the subsequent formation of the blow molded article;

(b) blow molding the tubular preform, thereby effecting different degrees of compression and stretch along the preform and shaping a hollow article with waste portions attached thereto;

(c) weighing said hollow article and/or at least one of said waste portions to monitor the position of a predetermined portion of the preform relative to the blow mold and taking an additional weight measurement to monitor visco-elastic properties of the material of the melt and deviations in a distribution of the material of the melt and deviation in a distribution of the material in said hollow article from a desired distribution, using the additional weight measurement to determine a profile factor, multiplying a correction strip by the profile factor to derive correction values and modifying said curve in accordance with said correction values;

(d) repeating step (a) with control of said gap width to produce a subsequent preform with a corrected distribution of material of said melt corresponding to the corrected program curve of step (c); and (e) repeating steps (c) and (d) to produce a series of blow-molded articles with respective preforms all of substantially identical melt volumes.

12. The method defined in claim 11 wherein said program curve is constituted of a profile curve superimposed upon a base gap which is substantially constant over said segments and a correction strip which has the shape of a ramp exponentially increasing toward the top of said preform.

* * * * *